United States Patent [19]
Rivoallan

[11] Patent Number: 6,130,974
[45] Date of Patent: Oct. 10, 2000

[54] LONG-INTERVAL GRATING IN AN OPTICAL FIBER AND MANUFACTURING METHOD

[75] Inventor: Loïc Rivoallan, Kermoroch, France

[73] Assignee: France Telecom, Paris, France

[21] Appl. No.: 09/120,836

[22] Filed: Jul. 22, 1998

[30] Foreign Application Priority Data

Jul. 24, 1997 [FR] France .................................. 97 09437

[51] Int. Cl.⁷ .................................................. G02B 6/34
[52] U.S. Cl. ............................ 385/37; 385/10; 385/124
[58] Field of Search .............................. 385/37, 10, 124, 385/28, 29; 359/566

[56] References Cited

U.S. PATENT DOCUMENTS

| 3,891,302 | 6/1975 | Dabby et al. ............................ 350/96 |
| 5,411,566 | 5/1995 | Poole et al. ............................. 65/402 |
| 5,825,041 | 10/1998 | Belek et al. ........................... 250/504 |

FOREIGN PATENT DOCUMENTS 0 307 228   3/1989   European Pat. Off. .
0 714 861   6/1996   European Pat. Off. .
0 736 784   10/1996  European Pat. Off. .

OTHER PUBLICATIONS

Marcuse et al., Mode Conversation Caused by Diameter Changes of a Round Dielectric Waveguide, Bell System Technical Journal, vol. 48, No. 10, Dec. 1969, pp. 3217–3232.

Hewlett et al., Cladding–Mode Coupling Characteristics of Bragg Gratings in Depressed–Cladding Fibre, Electronics Letters, vol. 31, No. 10, May 1995, pp. 820–822.

Chao–Xiang Shi et al., Mode Conversation Based on the Periodic Coupling by a Reflective Fiber Grating, Optics Letters, vol. 17, No. 23, Dec. 1992, pp. 1655–1657.

*Primary Examiner*—Darren Schuberg
*Assistant Examiner*—Fayez Assaf
*Attorney, Agent, or Firm*—Nilles & Nilles, S.C.

[57] ABSTRACT

A long-interval grating in an optical fiber is designed to enable the making of a mode-coupling filter. In particular, it has periodic variations of the diameter of the optical fiber and a symmetry of revolution.

11 Claims, 8 Drawing Sheets

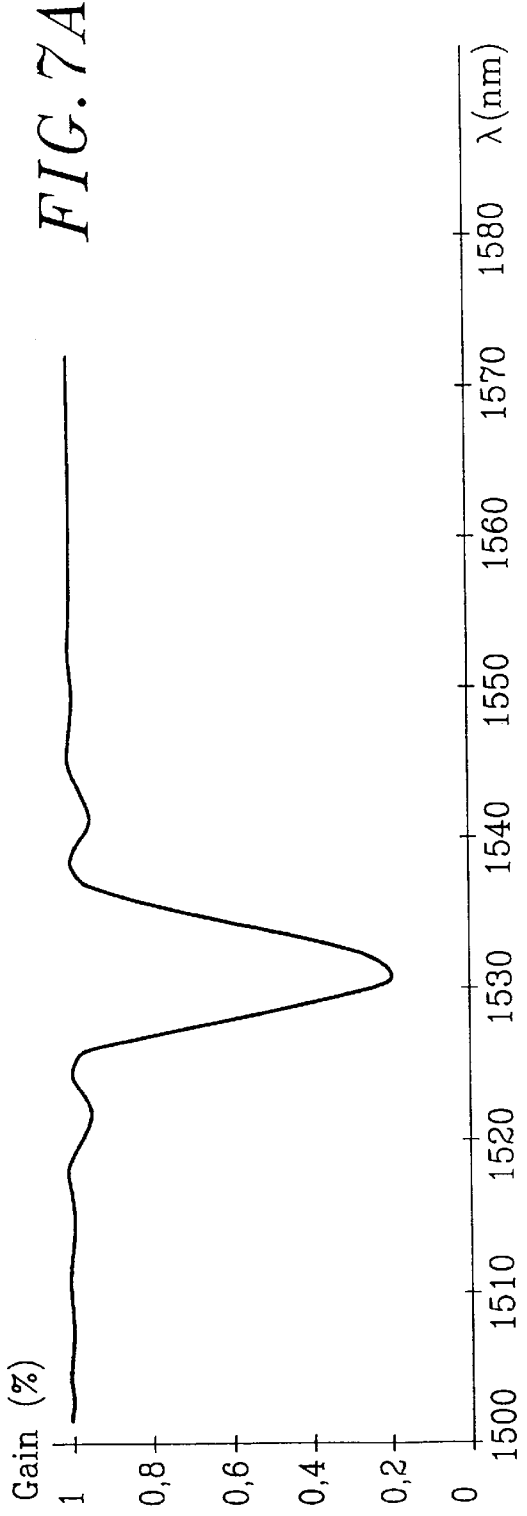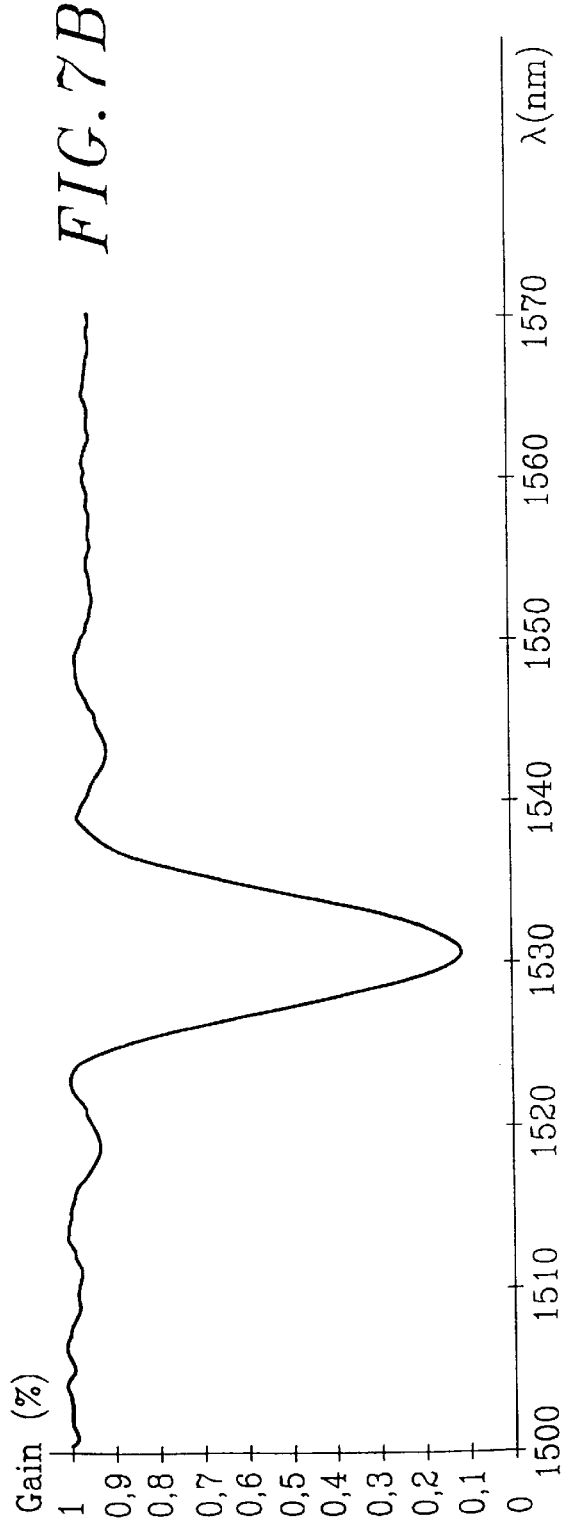

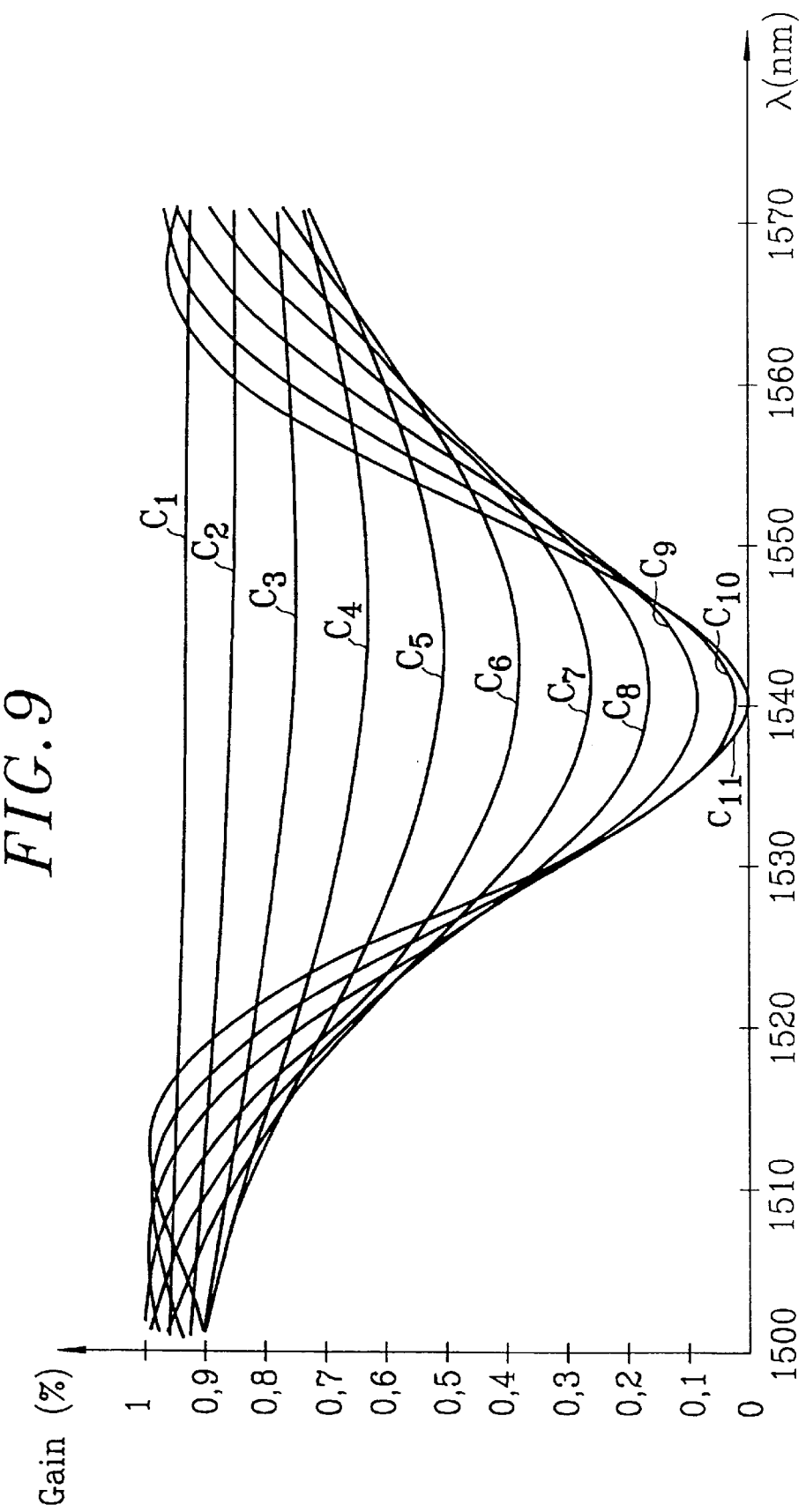

LONG-INTERVAL GRATING IN AN OPTICAL FIBER AND MANUFACTURING METHOD

BACKGROUND OF THE INVENTION

1. Field of the Invention

The invention relates to a long-interval grating in an optical fiber. This type of grating is used especially to obtain a mode-coupling filter. Mode-coupling filters are commonly used to equalize the gains of optical power amplifiers.

2. Description of the Prior Art

The long-interval gratings that exist at present have periodic deformations of the core of the optical fiber. These deformations may consist for example of changes in the refractive index which take the form of lines in the core of the fiber. These lines cannot be seen from outside as the smooth surface of the sheath does not allow anything to be seen. However, these standard type gratings cannot be used to make high-performance mode-coupling filters. Indeed, the filters obtained are very imprecise and/or dependent on the polarization of the light.

These imperfections are related especially to the manufacturing methods used. The standard gratings are made by means of lengthy and painstaking photo-recording methods in which the optical fiber is irradiated with ultraviolet rays. For this purpose, the fiber is subjected to preliminary hydrogenation and then exposed to ultraviolet rays. A final step is then used to resorb the hydrogen. The resorption of hydrogen is very slow, so much so that the time taken to make a grating by this kind of method is very lengthy. The process generally takes a few hours. Furthermore, the resorption of hydrogen is a very difficult step which requires a great deal of attention. Indeed, the indices of the core of the optical fiber are very difficult to plan by computation as they depend essentially on the conditions of resorption of hydrogen. It therefore becomes very difficult to foresee the value of the filtering wavelength of the gratings manufactured according to this method since a shift is created, the value of which fluctuates according to the conditions of resorption of hydrogen between the computed values and the experimental values. Consequently, the filters obtained by this type of lengthy and painstaking method are not precise and reliable enough for the perfect equalization of the gains of an optical power amplifier.

Furthermore, it sometimes happens that the periodic defect created in the core of the fiber does not have a symmetry of revolution. In this case, the filtering function obtained becomes dependent upon the state of polarization of the light.

SUMMARY OF THE INVENTION

The present invention makes it possible to mitigate the above-mentioned drawbacks for it proposes a long-interval grating in a optical fiber designed to enable the making of a very precise mode-coupling filter whose operation does not depend on the polarization of light. The long-interval grating according to the invention is more particularly characterized in that it has periodic variations in the diameter of the optical fiber and a symmetry of revolution.

Another object of the invention relates to a method for the manufacture of the long-interval grating according to the invention. This method of manufacture is especially characterized by a melting-drawing method. Through this method, the results obtained do not depend on the operating conditions, and the optical fiber is drawn point-by-point according to curves governed by predetermined laws of variation.

According to another characteristic of the invention, the melting-drawing method is performed on an optical fiber with a profile having two depressed internal sheaths. This fiber structure furthers a coupling between the fundamental mode of the core of the fiber and the particular mode of the sheath structure without being hampered by leaks caused by the presence of other modes.

Furthermore, contrary to the standard gratings of the prior art, it is not only the propagation modes of the core of the optical fiber but also those of the sheath that are modified. These modifications are due to the variations in the diameter of the fiber, namely the variations in the core and sheath diameters. The variations in the diameter of the fiber do not depend on the operating conditions of the method for the manufacture of the grating. They are computed and achieved very precisely according to the melting-drawing method. Consequently, the filtering wavelength of the filters obtained are identical to the theoretical computed filtering wavelengths. The grating according to the invention thus enables the making of a reliable and very precise filtering operation.

Furthermore, since the grating according to the invention is done uniformly by melting-drawing, it has a symmetry of revolution so much so that the associated filtering function is independent of the polarization of light.

Finally, the grating according to the invention can easily be identified since it does not have a smooth surface like standard gratings but a slightly undulating surface.

BRIEF DESCRIPTION OF THE DRAWINGS

Other special features and advantages of the invention shall appear from the description given by way of an exemplary illustration and made with reference to the appended figures, of which:

FIGS. 7A and 7B show transmission curves of a grating according to the invention made in an optical fiber, having a structure of the kind shown in FIG. 5, the curves being obtained respectively by computation and by experiment;

FIG. 9 show different transmission curves of another grating according to the invention each corresponding to a specified number of intervals.

MORE DETAILED DESCRIPTION

Figure 1:
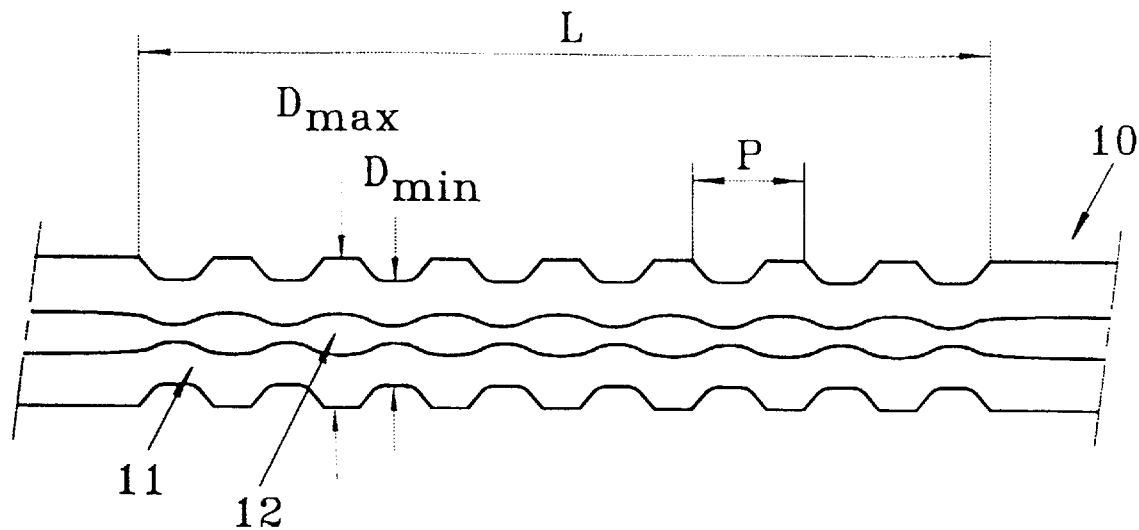
FIG. 1 shows drawing a sectional view of an optical fiber comprising a grating according to the invention.

A view in longitudinal section of an optical fiber 10 comprising a long-interval grating according to the invention is shown schematically in FIG. 1. The grating has periodic variations in the diameter of the fiber 10, namely periodic variations in the diameters of the sheath 11 and of the core 12 of the fiber. The diameter of the optical fiber 10 therefore ranges from a maximum value Dmax to a minimum value Dmin. The maximum value Dmax of the diameter corresponds to the diameter of the non-deformed fiber. The diameter of the optical fibers is standardized. The standardized fiber chosen to make the grating according to the invention has, for example, a diameter Dmax equal to 125 µm.

The increasing and decreasing variations of the diameter of the fiber are governed by laws of variation that are substantially rectilinear. Consequently, the periodic deformations created in the optical fiber 10 substantially form square notch shapes and the general shape of the grating approaches that of a sinusoid.

The value of the minimum diameter Dmin of the fiber preferably ranges from 100 to 124 µm. Consequently, the depth of the grating ranges from 25 to 1 µm. The interval P of the grating, namely the distance between two successive identical values of the diameter D of the fiber 10, ranges from 150 µm to 1 mm.

The depth of the grating is related to the number P of intervals of the grating. Indeed, the fewer intervals P there are in the grating, the deeper should this grating be in order to enable a decoupling of the luminous power that goes through the grating.

Furthermore, in a standard optical fiber, depending on the value of the interval P, the phase matching will not take place between the same propagation modes of the fiber. The following table bring together the different values of intervals P of the grating according to the phase matching to be achieved.

| Inter-mode matching | 1 and 2 | 1 and 3 | 1 and 4 | 1 and 5 | 1 and 6 | 1 and 7 | 1 and 8 | 1 and 9 |
|---|---|---|---|---|---|---|---|---|
| Grating interval (µm) | 442.8 | 403.5 | 351.9 | 325.6 | 298.8 | 252.0 | 216.9 | 198.8 |

Finally, the length L of the grating ranges from 1 mm to some centimeters. Advantageously, the grating according to the invention has a symmetry of revolution so much so that its operation does not depend on the polarization of light.

A long-interval grating according to the invention makes it possible in particular to obtain a mode-coupling filter designed to be used to equalize the gains of the optical power amplifiers. For this purpose, the working of the filter consists in transferring luminous power coming from the amplifier, from the fundamental LPO1 mode of the core of the fiber to the exterior, namely to another mode of the sheath of the fiber. The power transmitted by the optical fiber is therefore limited since it is partially absorbed by the sheath structure of the fiber. In this case, the mode coupling must be distributed throughout the length L of the long-interval grating.

The mode-coupling filter obtained from a grating according to the invention is placed in the optical power amplifier. When it is necessary to filter at different wavelengths, it is possible to obtain a serial (namely end-to-end) connection of several gratings according to the invention in the amplifier. In this case, each grating has an interval, a depth and a number of intervals that are proper to it.

Figure 2:
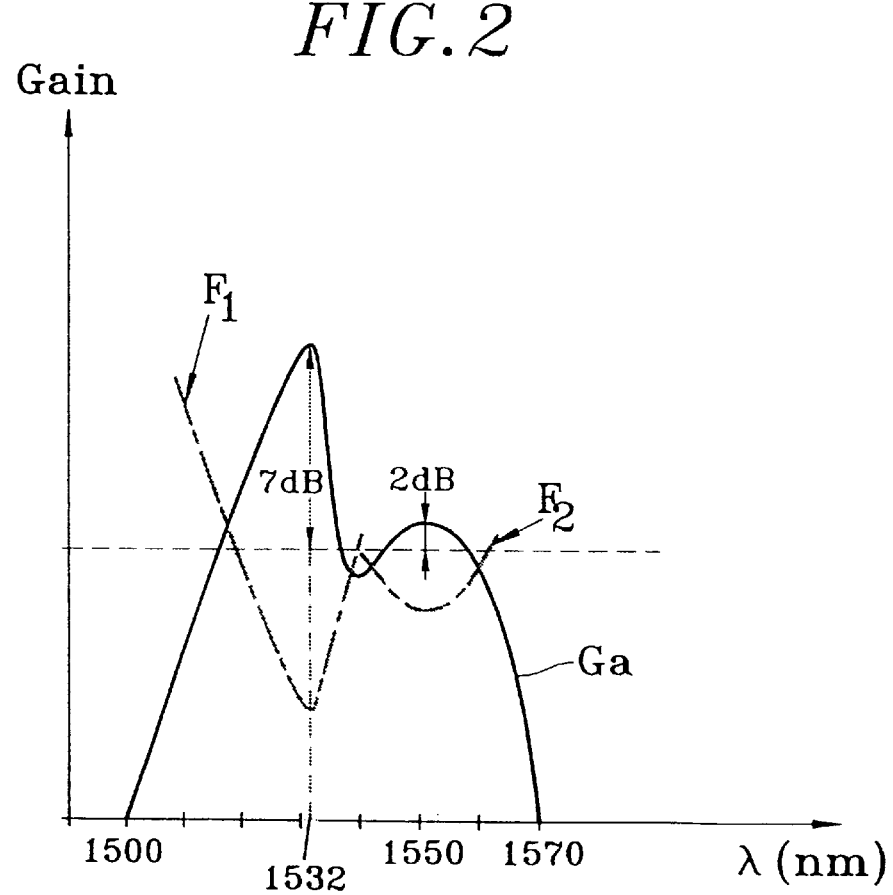
FIG. 2 shows a drawing of a gain curve of an optical power amplifier.

A gain curve Ga of an optical power amplifier is shown schematically in an unbroken line in FIG. 2. The amplifier is for example an erbium-doped optical fiber amplifier. The gain of this amplifier generally has a maximum value, at a wavelength $\lambda_1$, of 1532 nm and another maximum value in the vicinity of 1550 nm.

To compensate for the gain curve Ga of an amplifier of this kind, a first mode-coupling filter F1, made out of a grating according to the invention, must therefore act at $\lambda_1$=1532 nm, whereas the second mode-coupling filter F2 must act in the vicinity of 1550 nm.

In the example shown in FIG. 2, the first filter F1 has a fine band to compensate for the gain curve Ga of the amplifier which is narrow in the zone located around 1532 nm and enables the transmitted power to be attenuated by 7 dB. By contrast, the second filter F2 preferably has a wide band, for the curve Ga of the amplifier is spread out in the zone located around 1550 nm and enables the transmitted power to be attenuated by 2 dB.

The parameters and characteristics of a grating according to the invention are determined at the time of its manufacture, depending on the kind of filter to be made, namely the shape of the gain curve of the amplifier in which the grating will be inserted.

Advantageously, the grating according to the invention is obtained by a simple and fast method for the melting-drawing of an optical fiber. The melting-drawing method is implemented for example by means of the device described in the patent application EP-A-0 714 861 or else by an electrical arc method. This melting-drawing method is used to obtain a grating within only a few minutes.

The electrical arc is used to obtain a grating whose interval is greater than its width, namely the minimum fiber length that it subjects to melting. This width is generally greater than 0.5 mm. On the other hand, gratings that have smaller intervals cannot be manufactured by the electrical arc method. In this case, it is the device claimed in the patent application EP-A-0 714 861 that will enable the making of gratings with intervals greater than or equal to 100 µm.

This device comprises a heating means, means for shifting the optical fiber that are controlled by a first computer, and a second computer comprising a program to carry out the steps of the melting-drawing method and designed to provide data to the first computer so that this first computer can set up a feedback control loop over the position of each of the shifting means. The heating means are constituted by an oven including a blow torch and a $CO_2$ laser source.

In the standard optical fiber, to carry out coupling between the fundamental LPO1 mode of the core of the fiber and the LPO5 mode of the sheath, the interval of the grating should be about 325.6 µm. Thus, in this case, a part of the luminous power is transferred from the fundamental LPO1 mode to the LPO5 mode.

Figure 3:
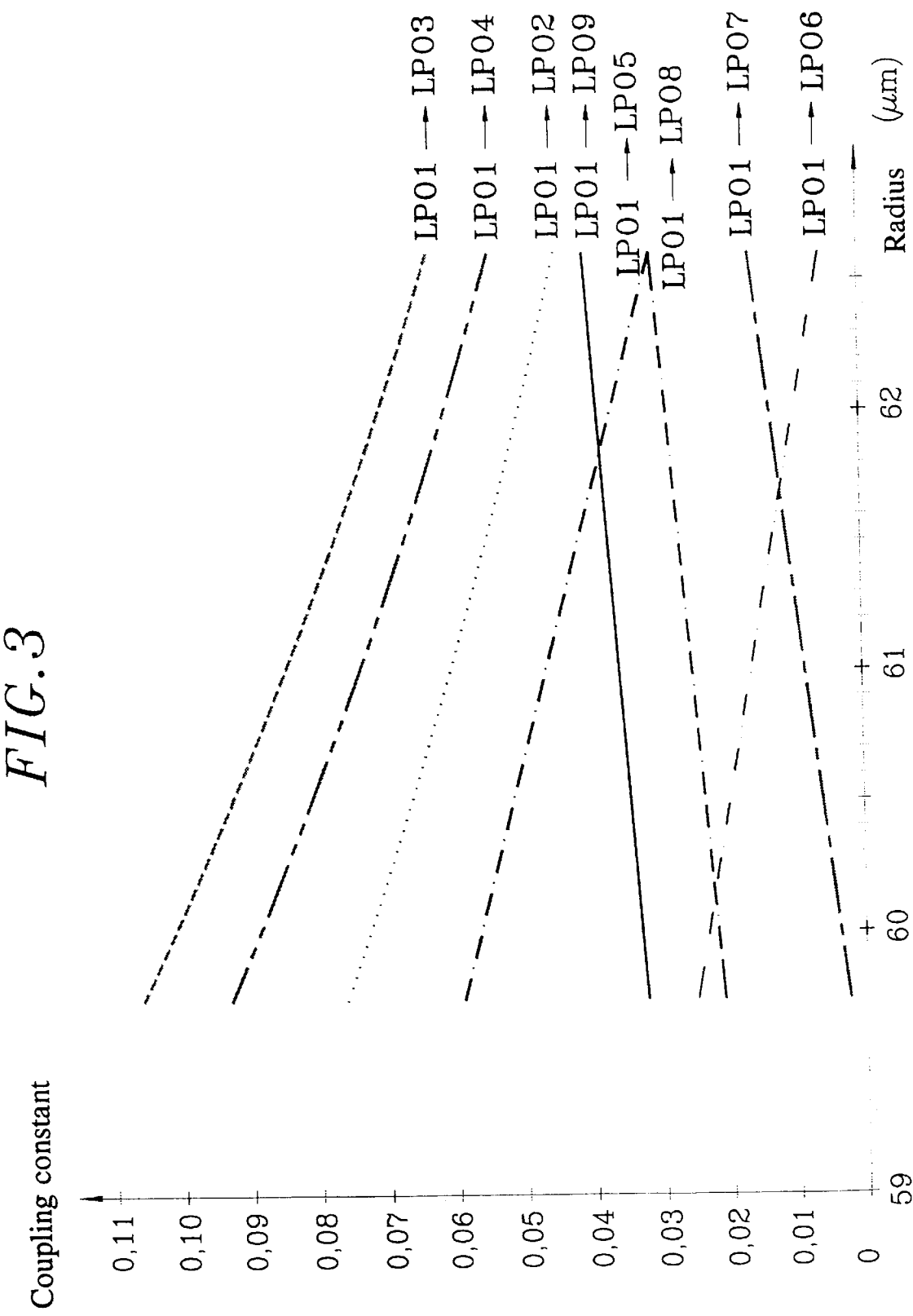
FIG. 3 shows curves representing the different coupling constants between the fundamental mode and other modes of a standard optical fiber as a function of the radius of this fiber.

FIG. 3 shows curves illustrating the different coupling constants between the fundamental mode and other modes in a standard optical fiber, as a function of the variations of the radius of this optical fiber. These curves relate solely to the LPOn modes which are centered modes whose propagation and couplings are independent of the state of polarization of light in the fiber. This figure shows that there is no LPO1–LPOn coupling that is appreciably greater than the others. Consequently, it appears to be very difficult to make a device implementing the fundamental mode of the fiber and a unique mode of the sheath structure of the standard fiber.

Figure 4:
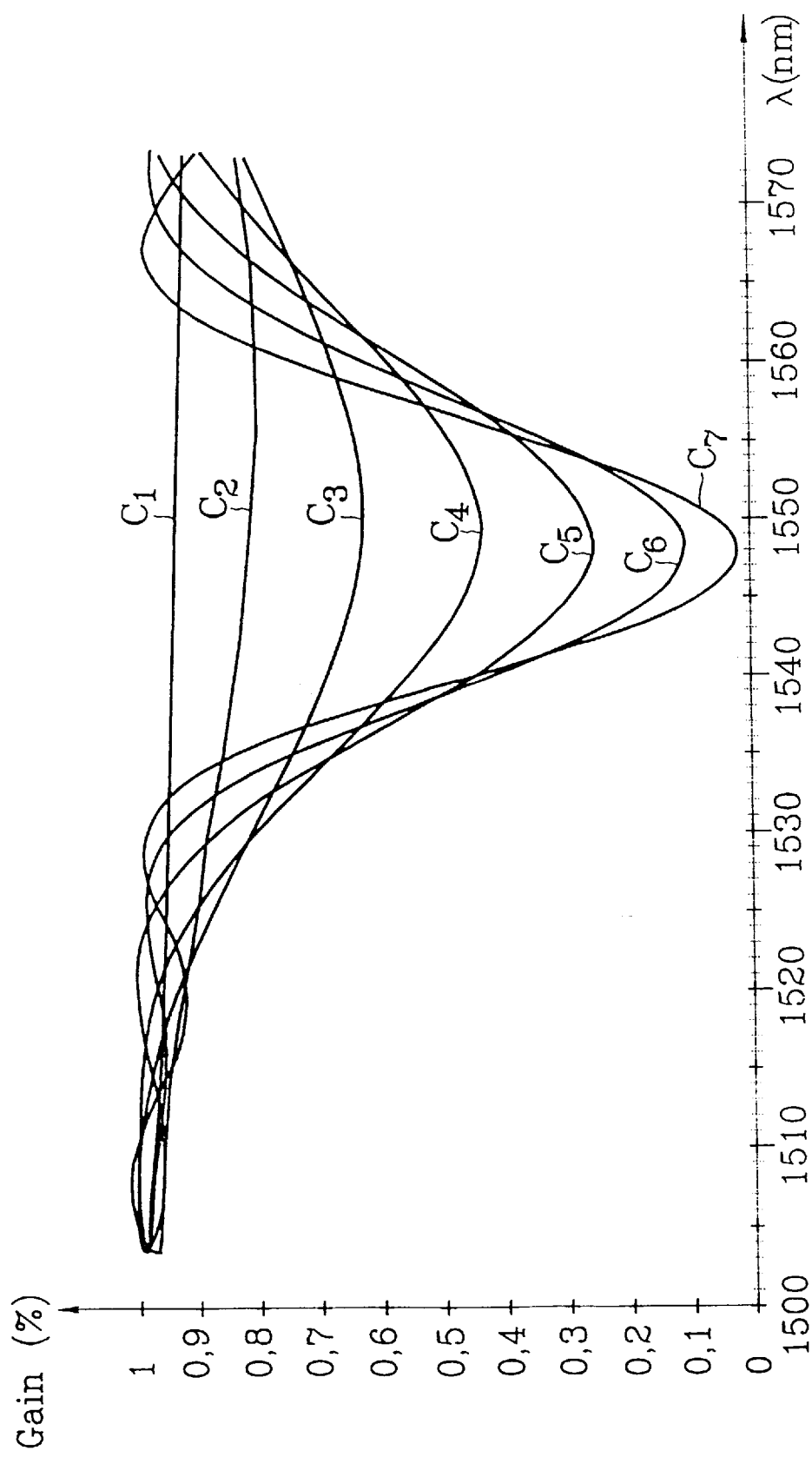
FIG. 4 shows transmission curves of a grating according to the invention made in a standard optical fiber, each curve corresponding to a specified number of intervals of the grating.

FIG. 4 shows curves of transmission C1 to C7 of a grating according to the invention made in a standard optic fiber. The theoretically filtering wavelength of this grating is planned to be 1.54 μm. The curves C1 to C7 correspond to gratings respectively comprising 5, 10, 15, 20, 25, 30 and 35 intervals. The results obtained experimentally correspond to filters matched at best at 1.548 μm, whose matching wavelength depends on the number of intervals of the grating. Indeed, when the grating has 35 intervals (curve C7), the resultant filtering wavelength is equal to 1.548 μm whereas, when it comprises 20 intervals (curve C4), the filtering wavelength is shifted towards 1.549 μm. This shift of the filtering wavelength as a function of the number of intervals is related to the large number of modes of propagation brought into play in a standard fiber.

Consequently, when a grating is made in a standard optical fiber, no mode behaves in a specific way and the coupling between the two modes chosen, for example between LP01 and LP05, is disturbed by the presence of the other modes.

This disturbance entails a slight shift in the experimental filtering wavelength as compared with the computed filtering wavelength.

The grating according to the invention is therefore preferably made in an optical fiber having a particular structure to enable a selective coupling between the fundamental LP01 mode of the fiber and one of the LPOn modes of the sheathed structure of the fiber. To enable the making of devices that implement the LP01 mode and an LPOn mode, and only one such mode, of the sheathed structure, it is necessary to meet the following conditions:

the fiber must promote high coupling between these two modes, the fiber must have far weaker coupling between the LP01 mode and all the other modes, the fiber must show an attenuation of the LPOn mode that is small enough for it to be propagated on the length of the device to be made, and finally the fiber must enable the prevention of any excitation or propagation of the non-centered LPmn modes so as to avert problems related to the polarization of light.

To meet these conditions, the optical fiber must have a particular profile. Initially, the need for a high coupling between the two selected modes leads to the use of a fiber having a depressed internal optical sheath with an index smaller than that of the external silica sheath.

Furthermore, to prevent the propagation of non-centered modes, one approach consists of the use of an optical fiber with a two-layer core structure.

However, these two types of structure are not satisfactory for they lead to losses by excessive curvatures of the fundamental mode.

Preferably, the optical fiber suited to the making of a grating according to the invention, enabling all the above-mentioned conditions to be met, has a profile with two depressed internal sheaths. A fiber of this kind makes it possible to obtain a very precise mode-coupling filter with high performance characteristics, for the coupling between the two modes is not disturbed by leakages that might appear through the presence of other modes in the sheath of the fiber.

Figure 5:
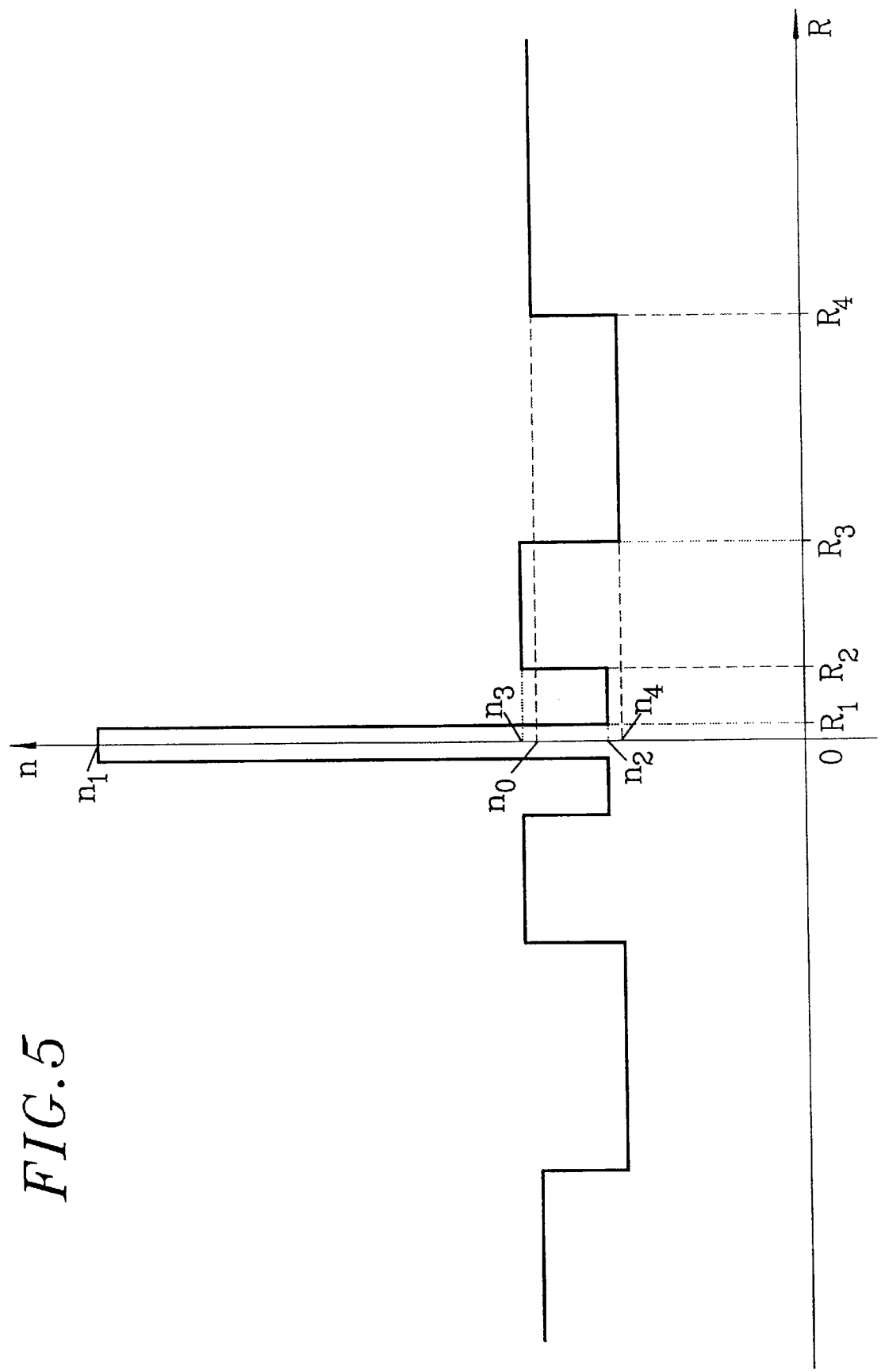
FIG. 5 is a drawing of an optical fiber structure adapted to the making of a grating according to the invention.

A drawing of an optical fiber profile suited to the making of a grating according to the invention is shown in FIG. 5. The two internal sheaths both have refractive indices n2 and n4 smaller than the index n0 of the external silica sheath. The index n1 of the core for its part is far greater than the indices of the different layers forming the sheath structure. The radii and refractive indices of the core and the different layers forming the sheath structure are determined so that the above conditions are met.

For this purpose, the optical fiber has an external silica sheath with a radius R0 equal to 62.5 μm and a refractive index n0; a core with a radius R1 ranging from 1.3 to 2 μm and an index n1 greater than n0 by a value ranging from 0.015 to 0.025; a first internal sheath with a radius R2 of about 6 μm and an index n2 smaller than n0 by a value ranging from 0.0025 to 0.003; a second internal sheath with a radius R4 ranging from 22.5 to 28 μm with an index n4 smaller than n0 by a value ranging from 0.003 to 0.004; and finally, an intermediate layer with a radius R3 ranging from 12.5 to 15 μm and an index substantially equal to n0 enabling the separation of the two internal sheaths.

Two optical fibers were made according to this type of profile. A first fiber referenced A hereinafter was made to further a coupling between the LP01 and LP05 modes while the second fiber referenced B hereinafter was made to enable as high a coupling as possible between these two LP01 and LP05 modes.

The structure of the fiber A is as follows:

core: n1=n0+0.023 R1=1.7 μm;

first internal sheath: n2=n0−0.0029 R2=6 μm;

intermediate layer: n3=n0+0.0001 R3=15 μm;

second internal sheath: n4=n0−0.0035 R4=27.5 μm;

n0 being the index of silica forming the external sheath with a radius R0=62.5 μm.

The structure of the second fiber B is as follows:

core: n1=n0+0.019 R1=1.5 μm;

first internal sheath: n2=n0−0.0029 R2=6 μm;

intermediate layer: n3=n0 R3=12.5 μm;

second internal sheath: n4=n0−0.0035 R4=22.6 μm;

n0 being the index of silica forming the external sheath with a radius R0=62.5 μm.

Figure 6:
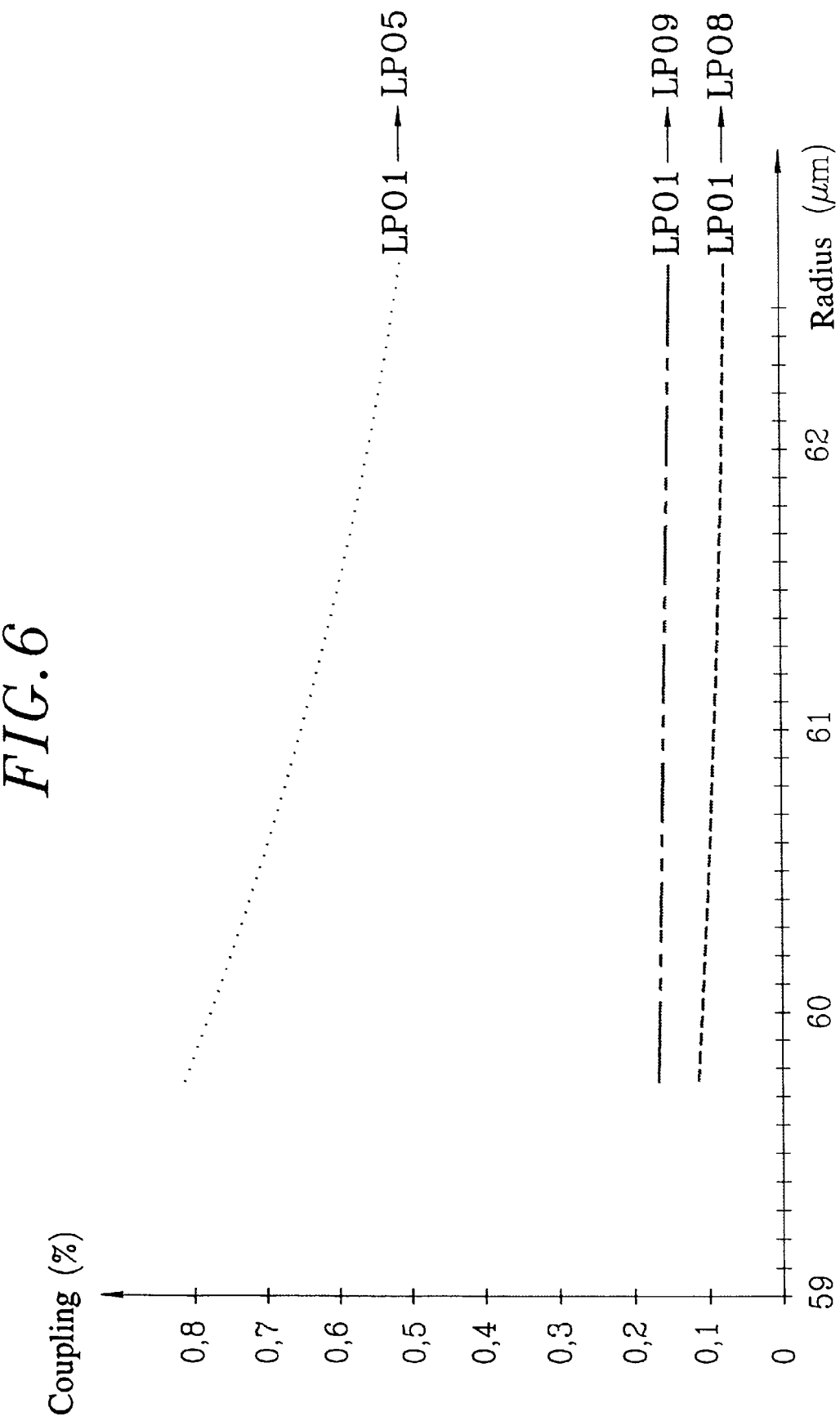
FIG. 6 shows curves representing the different coupling constants between the fundamental mode and other modes of an optical fiber having a structure of the kind shown in FIG. 5 as a function of the radius of this fiber.

FIG. 6 illustrates the coupling constants between the fundamental LP01 mode and the LP05, LP08, LP09 modes of the sheath structure of the fiber B. The LP05 mode has a coupling coefficient with the LP01 mode that is appreciably greater than the other modes. Furthermore, this LP05 mode has little coupling with the other modes.

FIGS. 7A and 7B show two transmission curves of a grating according to the invention made in the fiber A, the curves being respectively obtained by computation and by experiment. These transmission curves correspond to a fine filter whose filtering wavelength $l_1$ is centered on 1532 nm. To make a filter with these characteristics, the depth of the grating, the length of the intervals and their number is computed. In the example of FIG. 7A, the maximum diameter Dmax of the fiber is 125 μm and the minimum diameter Dmin is 120 μm. The intervals are obtained for example on a length equal to 200 μm. The percentage of the luminous power transferred from the LP01 mode to the LP05 mode, namely the yield of the filter, depends especially on the number of intervals of the grating. This number may vary from 1 to 500. In the example of FIG. 7A, because the grating is shallow, a large number of intervals is needed to make a fine filter with high performance characteristics, especially sufficient attenuation. For this purpose, the number of intervals is equal to 186 and the length of the grating is equal to 37.2 mm.

FIG. 7B shows a transmission curve, obtained by experiment, from a mode-coupling filter made by melting-drawing of the fiber A to the same dimensions as those computed here above. This curve is identical to the computed curve of FIG. 7A. The filtering wavelength $l_1$ is centered on 1532 nm and no shift can be seen with respect to the computed values. Consequently, the grating according to the invention is used to prepare a mode-coupling filter that possesses a very high-precision filtering function.

Figure 8:
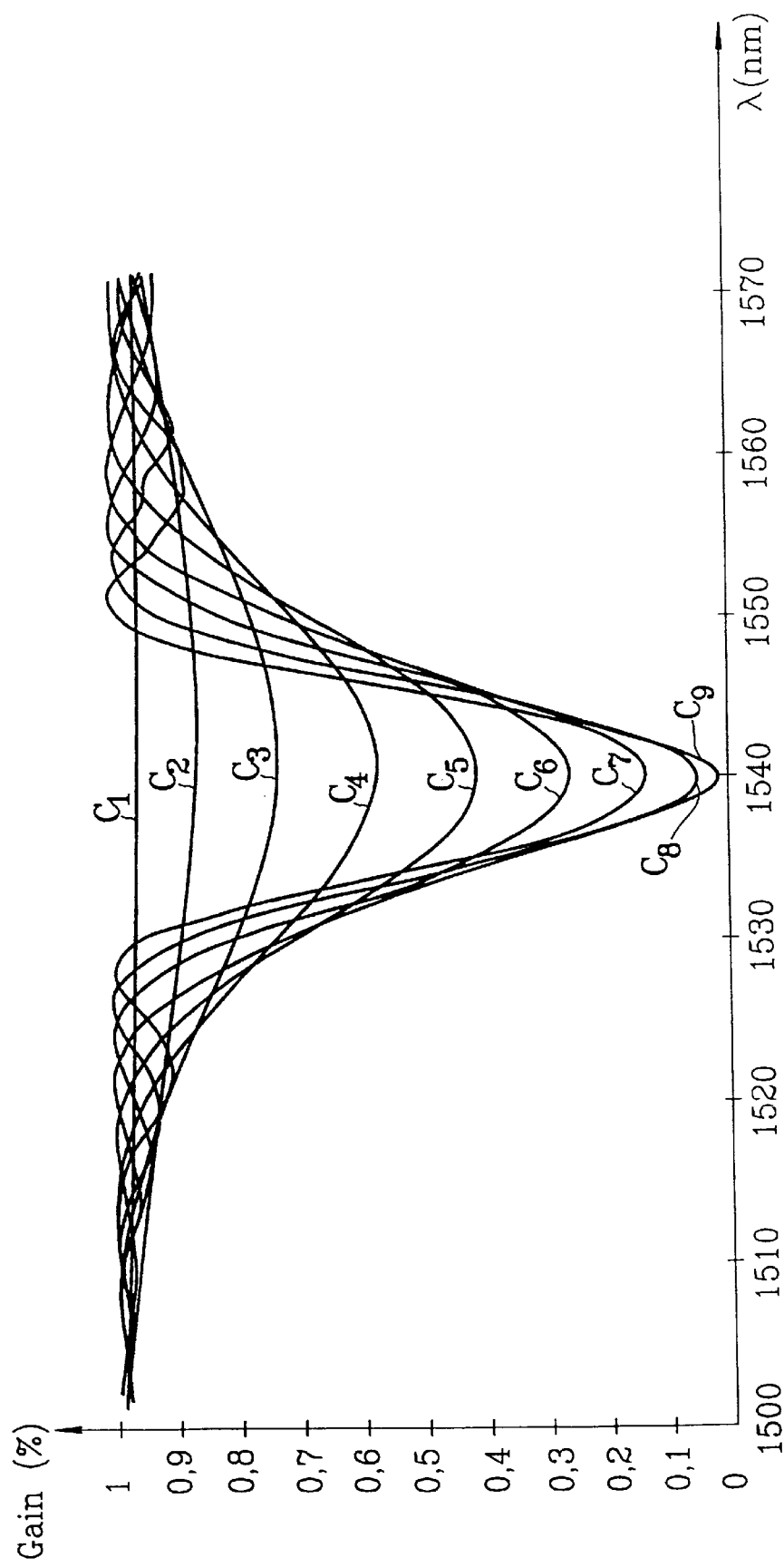
FIG. 8 shows different transmission curves of the grating according to the invention, each corresponding to a determined number of intervals.

FIG. 8 shows transmission curves C1 to C9 of a mode-coupling filter made with another grating according to the invention. Each transmission curve corresponds to a particular number of intervals of the grating. In this example, the grating has a maximum diameter Dmax equal to 125 μm and a minimum diameter Dmin equal to 120 μm, giving a grating depth of 5 μm. The length of the intervals is equal to 325.6 μm. This grating is made on an optical fiber with a profile similar to that of FIG. 5 and enables a transfer of luminous power from the fundamental LP01 mode of the core to the LP05 mode of the sheath structure of the fiber. Finally, in this example, the grating is made on a length ranging from 1 to 8.5 mm depending on the number of intervals.

These curves C1 to C9 furthermore show that the width of the filter is inversely proportional to the number of intervals of the grating. Indeed, the greater the number of intervals, the finer is the transmission curve of the filter. Thus, the width of the curve C9, corresponding to a filter obtained from a grating with 26 intervals, is one-and-a-half times smaller than the width of the curve C6 corresponding to a filter obtained from a grating comprising 18 intervals. The curves C1 to C9 correspond to gratings respectively comprising 3, 6, 9, 12, 15, 18, 21, 24 and 26 intervals. In this example, the mode-coupling filter enables the filtering of the wavelength of 1540 nm.

FIG. 9 shows other transmission curves C1 to C11 obtained for a mode-coupling filter created from another grating according to the invention. In this example, the grating has a maximum diameter Dmax equal to 125 μm and a minimum diameter Dmin equal to 115 μm, giving a depth of 10 μm. The length of the intervals is equal to 345.1 μm. The grating is made in a fiber having the profile with two depressed internal sheaths and enables a transfer of luminous power from the fundamental LP01 mode of the core of the fiber to the LP05 mode of the sheath structure. The attenuation and the width of the transmission curve of the grating depend on the number of intervals of this grating. In this example, the curves C1 to C11 correspond to gratings respectively comprising 1, 2, 3, 4, 5, 6, 7, 8, 9, 10 and 11 intervals and having a length respectively equal to 0.35 mm, 0.69 mm, 1 mm, 1.38 mm, 1.72 mm, 2.07 mm, 2.41 mm, 2.76 mm, 3.1 mm, 3.45 mm and 3.79 mm. The filtering wavelength associated with this grating is equal to 1540 nm.

The examples that have just been described are given purely by way of an illustration, and the invention cannot be limited to these particular embodiments. Indeed, the characteristics of a grating to be made are many and varied, and are matched with the characteristics of the optical power amplifier for which it is designed.

What is claimed is:

1. A long-interval grating in an optical fiber designed to enable the making of mode-coupling filters, wherein the grating has periodic variations in the diameter of the optical fiber and a symmetry of revolution, and wherein the optical fiber includes a core, a first depressed internal sheath, a second depressed internal sheath, and an external sheath, the first and second internal sheaths disposed between the core and the external sheath.

2. A grating according to claim 1, wherein the interval of the grating ranges from 150 μm to 1 mm.

3. A grating according to one of the claim 1, wherein the maximum diameter of the optical fiber is equal to 125 μm and wherein the minimum diameter ranges from 100 to 124 μm.

4. A grating according to claim 1, wherein a the number of intervals of the grating ranges from 1 to 500.

5. A grating according to claim 1, having a length ranging from 1 mm to some centimeters.

6. A method for the manufacture of a grating according to claim 1, consisting of the performance of melting-drawing operations on the optical fiber, the optical fiber including the first and second depressed internal sheaths.

7. A method for the manufacture of a grating according to claim 6, wherein the melting-drawing operation is performed by means of an electric arc.

8. A method according to claim 6, wherein the melting-drawing operation is carried out with a device comprising a heating means, means for the shifting of the fiber controlled by a first computer, and a second computer comprising a programme for the performance of the steps of the melting-drawing method and providing data to the first computer to set up a feedback control over the position of each of the shifting means.

9. A method according to claim 6, wherein the melting-drawing operation is carried out on an optical fiber comprising:

the external sheath made of silica with a refractive index n0 and a radius R0 equal to 62.5 μm, the core with an index n1 greater than n0 by a value ranging from 0.015 to 0.025 and the radius R2 ranging from 1.3 to 2 μm, the first internal sheath with an index n2 smaller than n0 by a value ranging from 0.0025 to 0.003 and a radius R2 of the order of 6 μm, the second internal sheath with an index n4 smaller than n0 by a value ranging from 0.003 to 0.004 and a radius R4 ranging from 22.5 to 28 μm, said first and second sheaths being separated from each other by an intermediate layer with an index n3 substantially equal to n0 and a radius R3 ranging from 12.5 to 15 μm.

10. A grating according to claim 1, wherein an intermediate layer is disposed between the first internal sheath and the second internal sheath.

11. A grating according to claim 1, wherein the first internal sheath is adjacent the core and the second internal sheath is adjacent the external sheath.

* * * * *